US008820502B2

(12) United States Patent
Chang et al.

(10) Patent No.: US 8,820,502 B2
(45) Date of Patent: Sep. 2, 2014

(54) ONE-WAY PULLEY SYSTEM FOR AN ALTERNATOR ASSEMBLY

(75) Inventors: Hung-Chih Chang, Taipei (TW); Siu-En Liu, Taipei (TW)

(73) Assignee: Victory Industrial Corporation, Hsi-Chih (TW)

( * ) Notice: Subject to any disclaimer, the term of this patent is extended or adjusted under 35 U.S.C. 154(b) by 250 days.

(21) Appl. No.: 12/875,149

(22) Filed: Sep. 3, 2010

(65) Prior Publication Data

US 2011/0057525 A1 Mar. 10, 2011

(30) Foreign Application Priority Data

Sep. 4, 2009 (TW) .............................. 98129945 A

(51) Int. Cl.
*F16D 41/064* (2006.01)
*F16H 55/36* (2006.01)
*F16D 41/066* (2006.01)

(52) U.S. Cl.
CPC .................................... *F16D 41/066* (2013.01)
USPC ..................... 192/45.018; 192/110 B; 474/74

(58) Field of Classification Search
USPC ................ 192/45.001–45.02, 110 B; 474/74
See application file for complete search history.

(56) References Cited

U.S. PATENT DOCUMENTS

| 3,087,589 A * | 4/1963 | Gorsky .................... 192/45.019 |
| 5,575,366 A * | 11/1996 | Zenmei et al. ........... 192/45.018 |
| 5,638,931 A * | 6/1997 | Kerr ........................ 192/45.005 |
| 5,675,202 A * | 10/1997 | Zenmei et al. ................ 310/100 |
| 5,695,031 A * | 12/1997 | Kurita et al. ............. 192/45.013 |
| 6,093,991 A * | 7/2000 | Tanaka .......................... 310/100 |
| 6,237,736 B1 * | 5/2001 | Ouchi ......................... 192/41 R |
| 6,588,560 B1 * | 7/2003 | Fujiwara .................. 192/45.015 |
| 2002/0050431 A1 * | 5/2002 | Murata et al. .................... 192/45 |
| 2002/0060117 A1 * | 5/2002 | Nakamura et al. .............. 192/45 |
| 2003/0098214 A1 * | 5/2003 | Titus et al. ................... 192/41 S |
| 2004/0011618 A1 * | 1/2004 | Aida ............................... 192/45 |
| 2006/0219510 A1 * | 10/2006 | Chung et al. .................... 192/45 |
| 2007/2672623 | 11/2007 | Pederson |

FOREIGN PATENT DOCUMENTS

| EP | 1429052 | 6/2004 |
| EP | 1469196 | 10/2004 |
| FR | 2897117 | 8/2007 |

OTHER PUBLICATIONS

The European search report for the corresponding European patent application.

* cited by examiner

*Primary Examiner* — Troy Chambers
*Assistant Examiner* — Lillian Nguyen
(74) *Attorney, Agent, or Firm* — Clifford B. Perry

(57) ABSTRACT

A one-way pulley for an alternator assembly includes an outer wheel, a clutch assembly, and a spindle. The outer wheel includes an axial hole extending longitudinally therethrough, whereby the axial hole forms an inner surface of the outer wheel. The clutch assembly is disposed within the axial hole of the outer wheel and includes a housing with an outer surface for contacting the inner surface of the outer wheel, and a plurality of rolling elements operable to extend into a pivot hole. The spindle is disposed within the pivot hole of the clutch assembly, the spindle having an outer surface for contacting the plurality of rolling elements and a coupling portion for connecting to a rotor shaft. The outer surface of the clutch assembly housing is fixedly attached to the inner surface of the outer wheel.

16 Claims, 6 Drawing Sheets

ONE-WAY PULLEY SYSTEM FOR AN ALTERNATOR ASSEMBLY

CROSS REFERENCE TO RELATED APPLICATIONS

This application claims priority to, and incorporates by reference TW patent application No. 98129945, filed Sep. 4, 2009.

BACKGROUND

The present invention relates to alternator assemblies, and more particularly to a one way pulley system for an alternator assembly.

It is well known in the art to use an alternator as an electricity generation mechanism for a vehicle. The rotor of the alternator is coupled to the engine of the vehicle by a belt and a belt pulley, which serve as a power transmission medium for driving the alternator to generate electric power. While the vehicle is running, the electric power generated by the alternator not only is supplied to electric equipment in the vehicle but also charges an automotive battery. The transmission belt pulley of a conventional automotive alternator is typically fastened to the rotor of the alternator with nuts such that the belt pulley is interlocked with and rotatable along with the rotor. However, when the engine accelerates or decelerates abruptly, the charging waveform of the alternator for charging the battery becomes unstable and shows significant transient variation. Meanwhile, the belt is taut on one side of the belt pulley and loose on the other side. As the loose part of the belt is under relatively low tension, a tensioner is provided thereon to adjust the belt tension. Nevertheless, when engine speed suddenly changes, the belt pulley, which is fastened with the nuts, and the belt, which is made of a flexible material, of the alternator cannot respond to the change of engine speed instantly. As a result, slippage between the belt and the belt pulley tends to occur. Moreover, while the belt experiences repeated stress from fluctuation of engine speed, the belt is also subjected to a centrifugal force generated by rotation of the belt pulley. Now that the centrifugal force varies with rotation speed of the belt pulley, the belt is often in an undesirable condition in which the belt, from a microscopic point of view, is pulled by internal tension and, from a macroscopic point of view, is flapping vigorously.

In order to prevent the transmission belt between the conventional alternator and the engine from slipping, flapping, and being unduly pulled, which are attributable to a speed difference caused by variation of rotation speed of the engine, it is known practice to provide a differential clutch device in the belt pulley of the automotive alternator, with a view to minimizing loss of transmission torque between the engine and the alternator, preventing the belt from loosening or being damaged, ensuring overall efficiency of the alternator, and avoiding noise which may otherwise result from vibration of the alternator and frequent shaking of the belt. The clutch device is configured for breaking the interlocking corotational connection between the rotor of the alternator and the belt pulley when the engine decelerates abruptly or when a brake is applied hastily. Therefore, even if the belt pulley of the alternator slows down to a low rotation speed or an idle speed, the rotor of the alternator keeps rotating because of its inertia and thus continues generating electricity. Later, due to an electromagnetic effect, governed by the Lenz's law, between the rotor and the stator of the alternator, rotation speed of the rotor gradually decreases until it is equal to that of the belt pulley, and in consequence the electric power generated by the alternator reaches a power output level matching that rotation speed. The provision of the clutch device advantageously allows an output current of the alternator to reduce slowly such that the rotor slows down progressively until it is synchronous with the belt pulley. Thus, a significant transient variation of waveform is avoided, and the alternator is protected from damage.

In principle, the foregoing belt pulley assembly with a one-way clutch function includes an outer wheel, a spindle, a clutch device, and two ball bearings. The outer wheel is axially penetrated by an insertion hole. The spindle is rotatably inserted through a central portion of the insertion hole. The clutch device is provided between the spindle and the outer wheel such that the spindle is coaxially rotatable with the outer wheel only in one direction and is left to rotate on its own if the outer wheel rotates relative to the spindle in an opposite direction. The two ball bearings are provided at a front end and a rear end of the insertion hole of the outer wheel, respectively, and mounted around the spindle.

Commercially available one-way belt pulleys for use with automotive alternators tend to have the following drawbacks in design:

1. The clutch device is formed with rolling channels having an abrupt change in its slope/depth. Hence, when the clutch device is rotating, rolling elements therein undergo excessively large radial displacement and thereby generate noise. In addition, due to improper design, connecting walls formed between the rolling channels and spring grooves fail to resolve and buffer stresses from the rolling elements.

2. The ball bearings and the belt pulley are not properly assembled. Therefore, when the belt pulley rotates at high speed, the ball bearings move axially and unstably, or balls in the ball bearings that are in contact with rolling surfaces of an inner race and of an outer race are subjected to excessive radial loading and thus cause the rolling surfaces to flake. Furthermore, the bearings generate considerable heat when rotating at high speed. When grease inside the bearings melts and evaporates, the balls and the rolling surfaces begin to seize, thus damaging the ball bearings and generating noise. Even more seriously, the high heat, once conducted to the clutch device, may melt grease therein and accelerate wear and tear thereof.

3. There is no positioning structure on an inner periphery of the belt pulley that can serve as an axial reference during assembly, nor any structure that can prevent the clutch device from axial displacement. Consequently, not only is it difficult to position components inside the belt pulley, but also the clutch device may displace axially or askew when rotating at high speed, thus impairing the overall precision of operation.

In view of the aforementioned drawbacks, an improved one-way pulley system for an alternator assembly is needed.

SUMMARY

The present invention provides an improved one-way pulley system for an alternator assembly which includes an outer wheel, a clutch assembly, and a spindle. The outer wheel includes an axial hole extending longitudinally therethrough, whereby the axial hole forms an inner surface of the outer wheel. The clutch assembly is disposed within the axial hole of the outer wheel and includes a housing with an outer surface for contacting the inner surface of the outer wheel, and a plurality of rolling elements operable to extend into a pivot hole. The spindle is disposed within the pivot hole of the clutch assembly, the spindle having an outer surface for contacting the plurality of rolling elements and a coupling portion for connecting to a rotor shaft. The outer surface of the clutch assembly housing is fixedly attached to the inner surface of the outer wheel.

These and other features of the invention will be better understood in view of the following drawings and exemplary embodiments of the invention.

Figure 1:
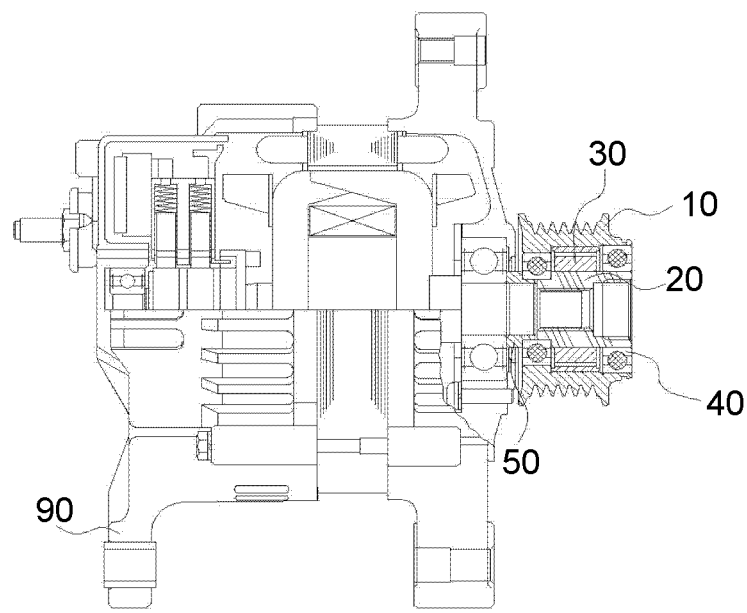
FIG. 1 illustrates an exemplary one-way pulley system employed in a automotive application in accordance with one embodiment of the present invention.
Figure 2:
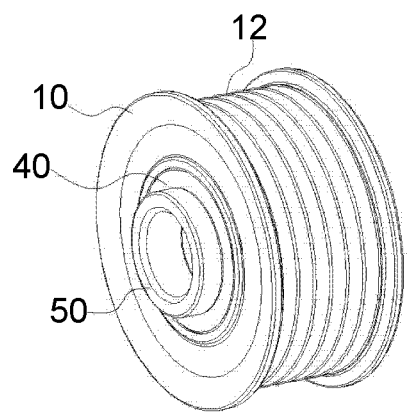
FIG. 2 is a perspective view of an exemplary one-way pulley system in accordance with the present invention.

For clarity, previously-numbered features retain their reference indices in subsequent drawings.

EXEMPLARY EMBODIMENTS OF THE INVENTION

In order to overcome the foregoing drawbacks of the prior and solve the difficulties involved, the present invention provides a one-way pulley system which includes an outer wheel, a spindle, a clutch assembly, two bearings, and an insertion tube.

The outer wheel is centrally provided with an axial hole, wherein a front end of the axial hole is slightly reduced in diameter to form a step portion. The outer wheel has an outer peripheral wall provided with a belt groove. The spindle is inserted coaxially through a central portion of the axial hole of the outer wheel. An insertion hole is provided between and extends through two ends of the spindle. A coupling portion having a step-like structure and a reduced radius is provided at a front end of the spindle. The clutch assembly includes a housing, a plurality of rolling elements, a plurality of resilient elements, and two sealing covers. The housing has an outer peripheral wall fixed in position to an inner wall of the axial hole of the outer wheel by tight fit and gluing, such that an end of the housing presses against the step portion of the outer wheel. The housing is formed with a pivot hole having a diameter greater than an outer diameter of the spindle, and the housing is pivotally mounted around the spindle via the pivot hole. In addition, the housing has an inner peripheral wall provided with a plurality of clutch grooves, wherein each clutch groove is divided into a rolling channel, a resilient element groove, and a buffer wall. The rolling channel is a channel with a curved surface and a depth increasing from one end to an opposite end of the rolling channel. The resilient element groove is located at the deeper end of the corresponding rolling channel and faces the corresponding rolling channel. The buffer wall is an inclined wall at a connecting portion between the corresponding rolling channel and the corresponding resilient element groove.

Each rolling element is provided between the corresponding rolling channel of the housing and the spindle so as to roll between a wall of the corresponding rolling channel and a wall of the spindle. Each rolling element has a rolling path limited by a distance between a bottom wall of the corresponding rolling channel and the wall of the spindle such that each rolling element is prevented from reaching an end wall at the shallower end of the corresponding rolling channel. In other words, there is always a distance between each rolling element and the end wall at the shallower end of the corresponding rolling channel.

Each resilient element is provided at an end of the corresponding resilient element groove and has an end pressing against the corresponding rolling element. Each sealing cover is provided with a through hole for being inserted by the spindle. The sealing covers are sealingly provided at two ends of the housing, respectively, and correspond in position to the clutch grooves.

The bottom wall of each rolling channel is an eccentric curved surface eccentric with respect to the spindle. The center of the curved surface is located outside a baseline extending through the center of the spindle and a point having rotated around the center of the spindle by an angle $\alpha$ from a position corresponding to the center of the corresponding rolling element when this rolling element is engaged with the spindle, toward the deeper end of the rolling channel. Exemplary, the angle $\alpha$ ranges from 7 to 25 degrees.

Each resilient element is positioned perpendicular to the corresponding baseline, and when the corresponding rolling element rolling along its rolling path presses against the corresponding buffer wall, a compressed length of the resilient element is greater than a fully compressed length of the resilient element.

The bearings are inserted in the front and rotor sides of the axial hole of the outer wheel, respectively. The outer peripheral walls of the bearings are fixed in position to the front end and a rear end of the axial hole, respectively. An inner peripheral wall of the bearing at a front side of the outer wheel is fixedly mounted around the coupling portion of the spindle by compression fit. The bearing at a rotor side of the outer wheel is fixedly mounted around an outer peripheral wall of the spindle at a rear end thereof by compression fit.

The insertion tube has an end provided with a projecting ring. The projecting ring of the insertion tube is inserted in the bearing at the front side of the outer wheel. The one-way pulley system is characterized by the following:

1. With the step portion provided at an inner peripheral wall of the outer wheel, it can be ensured that, while installing the clutch assembly, end surfaces of the clutch assembly are perpendicular to the spindle. The step portion also prevents the clutch assembly from axial displacement during high-speed rotation. Moreover, the step portion serves as an axial reference for positioning the various components inside the outer wheel during assembly.

2. As the bottom wall of each rolling channel formed according to the present invention has a smoothly varying slope, the rolling elements will not undergo radial vibrations with large amplitude when rolling in the rolling channels, and therefore noise can be effectively minimized. Furthermore, with reduced radial displacement of the rolling elements along their rolling paths, the rolling elements when in contact with the resilient elements will not load the resilient element to such extent that the centers of the resilient elements are shifted. The resilient elements are thus protected from buckling or having a column action.

3. With the bearings of the present invention being fixed in position by interference fit as well as by gluing with an anaerobic adhesive, a relatively large tolerance in dimensions is allowed in the production process. It can also be assured that, after assembly, the bearings will not slip relative to the spindle and the outer wheel at contact surfaces therebetween. Besides, the bearings are relieved not only from friction which may otherwise result from high-speed rotation under undue compression, but also from an excessively high temperature otherwise caused by such friction.

Referring to FIG. 1 through FIG. 5, an improved one-way pulley system according to the present invention. In an exemplary application, the one-way pulley system is employed for use with an automotive alternator 90 in an automobile. In an exemplary embodiment, the one-way pulley system includes an outer wheel 10, a spindle 20, a clutch assembly 30, two bearings 40a and 40b, and an insertion tube 50. The spindle 20 is configured to connect to a rotor shaft 60 for spinning the alternator 90. Exemplary the spindle 20 includes a threaded end on its coupling portion 22 for receiving a threaded end 62 of the rotor shaft 60.

The outer wheel 10 includes an axial hole 11 extending longitudinally therethrough. The axial hole 11 includes a step portion 111 proximate to the front/rotor side of the outer wheel 10 (left side of the outer wheel's center in FIG. 3), the step portion being reduced in diameter relative to the rear side of the axial hole 11 (right side of the outer wheel's center in FIG. 3). The outer wheel 10 has an outer peripheral wall formed with a belt groove 12 for a belt to loop around.

Figure 3:
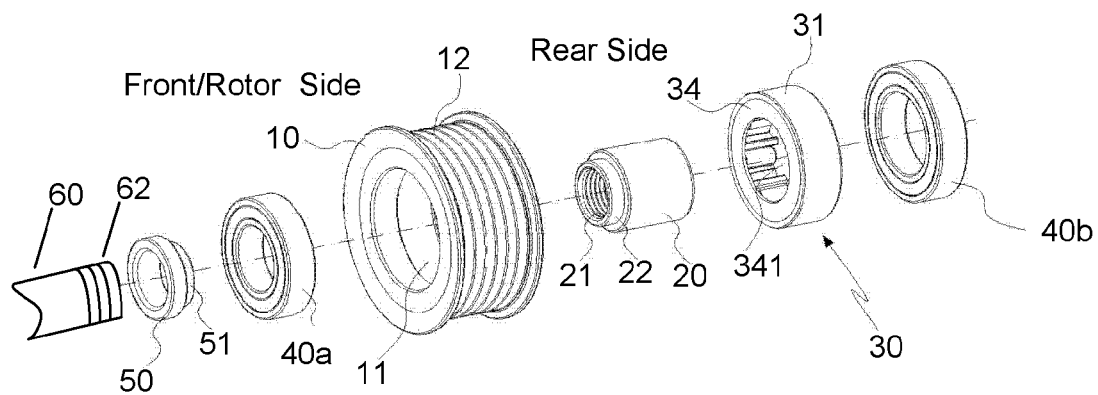
FIG. 3 is an exploded perspective view of the one-way pulley system shown in FIG. 2.

Referring to FIG. 3, the spindle 20 is inserted coaxially through a central portion of the axial hole 11 of the outer wheel 10. An insertion hole 21 extends longitudinally through two ends of the spindle 20. A coupling portion 22 is provided at a front end of the spindle 20 and formed as a narrow end having a step-like structure and a reduced radius. Exemplary, the coupling portion 22 is configured (e.g., tapped) to receive threads disposed on the end portion 62 of a rotor shaft 60.

Figure 4:
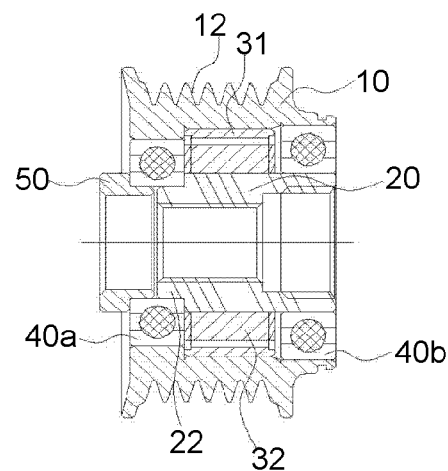
FIG. 4 is a side sectional view of the one-way pulley system according shown in FIG. 2.

With reference to FIG. 3 and FIG. 4, the clutch assembly 30 is pivotally mounted around an outer peripheral wall of the spindle 20. Exemplary, the clutch assembly 30 is fixedly attached to the inner wall of the outer wheel 10 by compression fit, and further exemplary, additionally by gluing with an anaerobic adhesive. The clutch assembly 30 further includes a housing 31, a plurality of rolling elements 32, a plurality of resilient elements 33, and two sealing covers 34. The housing 31 is installed into the axial hole 11 through the rear side and located so as to press against the step portion 111 of the outer wheel 10.

Figure 5:
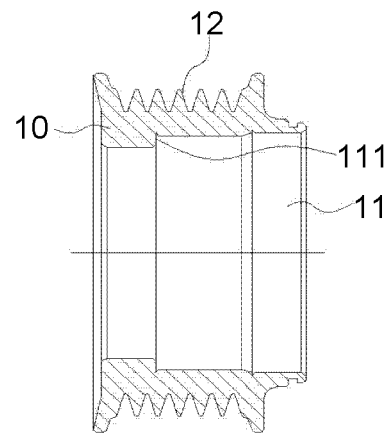
FIG. 5 is a side sectional view the outer wheel shown in FIG. 3.
Figure 6:
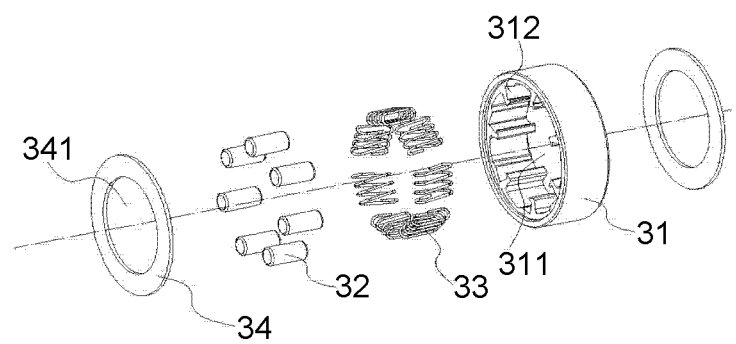
FIG. 6 is an exploded perspective view of the clutch assembly shown in FIG. 3.
Figure 7:
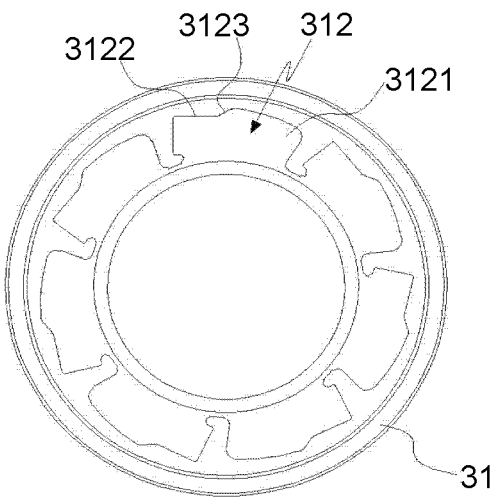
FIG. 7 is an end view of a housing of the clutch assembly shown in FIG. 6.

With reference to FIG. 5 to FIG. 7, the housing 31 includes a pivot hole 311 having a diameter greater than an outer diameter of the wall of the spindle 20, and the housing 31 is coaxially mounted around the spindle 20 via the pivot hole 311. The housing 31 further has an inner peripheral wall concavely provided with a plurality of clutch grooves 312. Exemplary, the number of the clutch grooves 312 may range from four to ten, and is seven in a particular exemplary embodiment.

Figure 12:
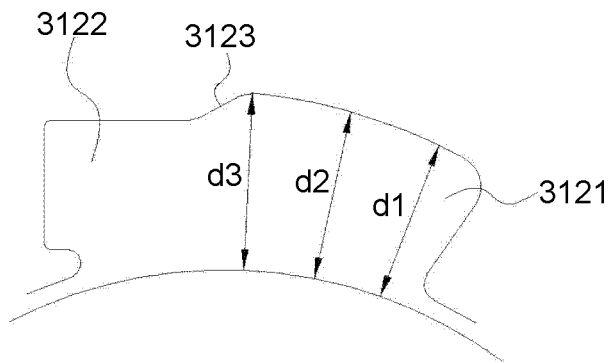
FIG. 12 is a schematic drawing of a clutch groove shown in FIGS. 7-9.

Each clutch groove 312 is further divided into a rolling channel 3121, a resilient element groove 3122, and a buffer wall 3123. The rolling channel 3121 is a channel with a curved surface and a depth increasing from one end to an opposite end of the rolling channel 3121. Reference is made to FIG. 12, wherein depths d1<d2<d3. The resilient element groove 3122 is provided at the deeper end, defined herein as the deep end, of the corresponding rolling channel 3121 and faces the corresponding rolling channel 3121. The buffer wall 3123 is an inclined wall formed at a connecting portion between the corresponding rolling channel 3121 and the corresponding resilient element groove 3122.

Each rolling element 32 is configured as a roller and inserted between the corresponding rolling channel 3121 of the housing 31 and the spindle 20 so as to roll between a wall of the corresponding rolling channel 3121 and a wall of the spindle 20. Each rolling element 32 has a diameter greater than a distance between a bottom wall of the corresponding rolling channel 3121 at the shallower end, defined herein as the shallow end, and the wall of the spindle 20. Hence, the rolling path of each rolling element 32 is limited by a distance between the bottom wall of the corresponding rolling channel 3121 and the wall of the spindle 20. As a result, each rolling element 32 is prevented from reaching and thus keeps a distance D from an end wall at the shallow end of the corresponding rolling channel 3121. In a particular embodiment, distance D ranges from 0 cm to 3 mm, and in a particular embodiment is 1 mm. When the spindle 20 is rotated relative to the housing 31 in a direction from the deep end to the shallow end of the rolling channel 3121, the spindle 20 engages with the rolling elements 32 where the distance between the spindle 20 and the bottom wall of each rolling channel 3121 is equal to an outer diameter of the rolling element 32. Consequently, the spindle 20 is driven to rotate synchronously with the housing 31 and the outer wheel 10. However, when the spindle 20 is rotated relative to the housing 31 in an opposite direction, the spindle 20 will not engage with the rolling elements 32 and is left to rotate on its own. Thus, the structure of the clutch assembly 30 provides a clutching function depending on the direction of relative rotation between the spindle 20 and the clutch assembly 30.

Each resilient element 33 is provided at an end of the corresponding resilient element groove 3122 and has an end pressing against a peripheral wall of the corresponding rolling element 32 so as to exert a restoring force thereto.

Each sealing cover 34 includes a through hole 341 corresponding in position to and inserted by the spindle 20. The sealing covers 34 are sealingly provided at two ends of the housing 31, respectively, and correspond in position to the clutch grooves 312 so as to retain the rolling elements 32 and the resilient elements 33 in the housing 31.

Figure 8:
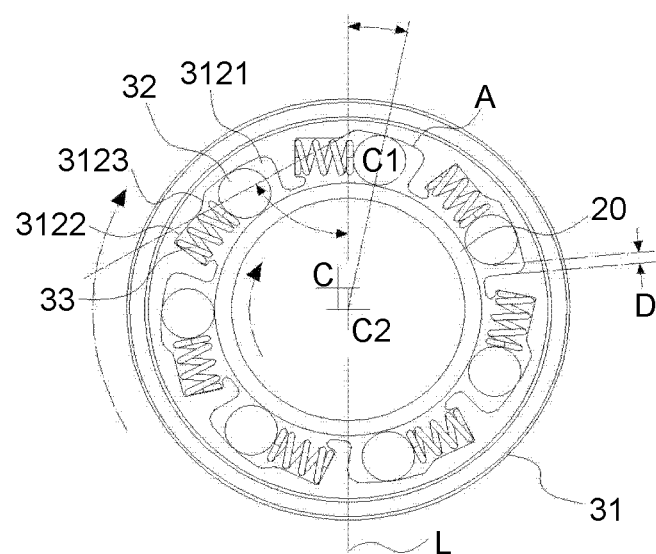
FIG. 8 is an end view of the clutch assembly shown in FIG. 3 with sealing covers removed.

Referring to FIG. 8, the bottom wall A of each rolling channel 3121 is an eccentric curved surface eccentric with respect to the spindle 20. Each curved surface corresponds to a center C, which is located outside a baseline L extending through the center C2 of the spindle 20 and a point having rotated around the center C2 of the spindle 20 by an angle α from a position corresponding to the center C1 of the corresponding rolling element 32 when this rolling element 32 is engaged with the spindle 20, toward the deep end of the corresponding rolling channel 3121. The angle α ranges from 7 to 25 degrees and is 11.5 degrees in the present embodiment.

Figure 9:
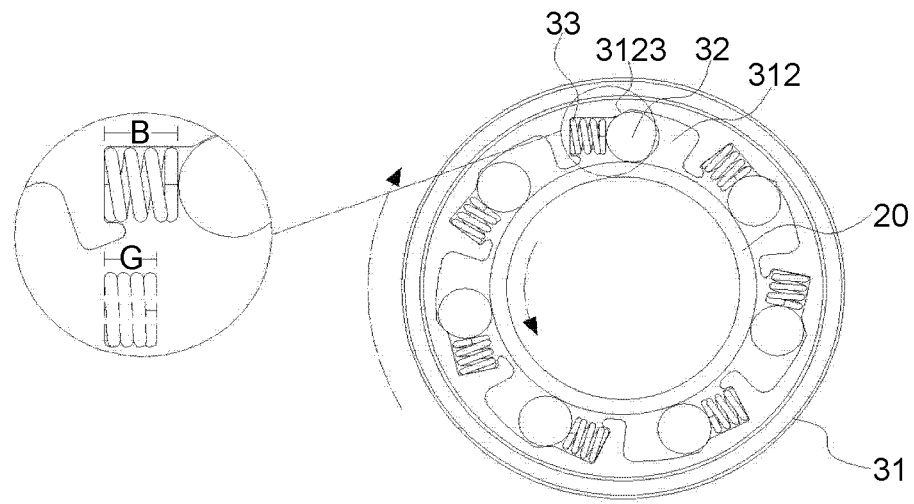
FIG. 9 is another end view of the clutch assembly shown in FIG. 3, with the sealing covers removed.
Figures 10, 11:
FIG. 10 is a side view of a resilient element shown in FIGS. 6, 8 and 9.
FIG. 11 is an end view of the resilient element shown in FIGS. 6, 8 and 9.

Referring to FIG. 9, each resilient element 33 is positioned perpendicular to the corresponding baseline L, and the position where each rolling element 32 presses against the corresponding buffer wall 3123 is defined as the terminal point of the rolling path of each rolling element 32. When each rolling element 32 arrives at the terminal point of its rolling path, a compressed length E of the corresponding resilient element 33 is greater than a fully compressed length G of this corresponding resilient element 33. Furthermore, each resilient element 33 is a spring. For better performance, each resilient element 33 can be a helical compression spring with an oblong cross section, i.e., the so-called magazine spring, as shown in FIG. 10 and FIG. 11. In addition, each resilient element 33 has an outer diameter corresponding to the corresponding resilient element groove 3122. Besides, end openings of each resilient element 33 are processed to form two closed ends or two filed flat ends so as to prevent each resilient element 33 from buckling when loaded unevenly.

Figure 13:
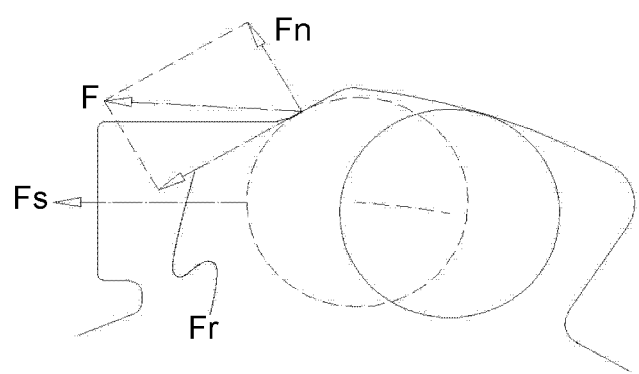
FIG. 13 is a schematic drawing showing forces applied to a buffer wall and to the resilient element of the present invention.

Moreover, in order for the buffer walls 3123 to effectively resolve stresses from the rolling elements 32, an included angle β between each buffer wall 3123 and the corresponding baseline L exemplary ranges from 40 to 70 degrees, and in the present embodiment, the included angle β is 60 degrees. Thus, the buffer walls 3123 can properly resolve forces exerted by the rolling elements 32 while the rolling elements 32 are rolling. As shown in FIG. 13, an inertia force F of the rolling element 32 acting on the buffer wall 3123 is resolved into a normal component of force $F_N$ and a tangential component of force $F_T$. Also shown in FIG. 13 is a force $F_S$ acting on the resilient element 33 by the rolling element 32.

The bearings (e.g., ball bearings) 40a and 40b are inserted in the front end and a rear end of the axial hole 11 of the outer wheel 10, respectively. Outer peripheral walls of the bearings 40a and 40b are fixed in position to the front end and a rear end of the axial hole 11, respectively, by compression fit or slide fit, with the assistance of the anaerobic adhesive. An inner peripheral wall of the bearing 40a at a front end of the outer wheel 10 is fixedly mounted around the coupling portion 22 of the spindle 20 by compression fit. The bearing 40b at a rear side of the outer wheel 10 is fixedly mounted around the outer peripheral wall of the spindle 20 at a rear end thereof by compression fit.

The insertion tube 50 is a hollow annular tube having an end formed with a projecting ring 51. The projecting ring 51 is inserted in the bearing 40a at the front end of the outer wheel 10 so as to serve a butting function when the one-way pulley system is installed on the automotive alternator 90.

Compared with the prior art, the one-way belt pulley according to the present invention for use with an automotive alternator has the following characteristics:

1. With the step portion 111 provided at an inner peripheral wall of the outer wheel 10, it can be ensured that, while installing the clutch assembly 30, end surfaces of the clutch assembly 30 are perpendicular to the spindle 20. The step portion 111 also prevents the clutch assembly 30 from axial displacement during high-speed rotation. Moreover, the step portion 111 serves as an axial reference for positioning the various components inside the outer wheel 10 during assembly.

2. As the bottom wall A of each rolling channel 3121 formed according to the present invention shows a smooth variation of slope, the rolling elements 32 will not undergo radial vibrations with large amplitude when rolling in the rolling channels 3121, and in consequence noise can be effectively minimized. Furthermore, with reduced radial displacement of the rolling elements 32 along their rolling paths, the rolling elements 32 when in contact with the resilient elements 33 will not load the resilient elements 33 to such extent that the centers of the resilient elements 33 are shifted. Thus, the resilient elements 33 are protected from buckling or having a column action.

3. With the bearings 40a and 40b of the present invention being fixed in position by compression fit as well as by gluing with the anaerobic adhesive, a relatively large dimensional tolerance is allowed in the production process.

In view of the foregoing detailed embodiments, an exemplary embodiment of the invention can be seen as an one-way pulley for an alternator assembly, having:

an outer wheel 10 having an axial hole 11 extending longitudinally therethrough, the axial hole 11 forming an inner surface of the outer wheel 10;

a clutch assembly 30 disposed within the axial hole 11 of the outer wheel 10, the clutch assembly 30 comprising a housing 31 with an outer surface for contacting the inner surface of the outer wheel 10, and a plurality of rolling elements 32 operable to extend into a pivot hole 311;

a spindle 20 disposed within the pivot hole 311, the spindle having an outer surface for contacting the plurality of rolling elements 32 and a coupling portion 22 for connecting to a rotor shaft 60, wherein the outer surface of the clutch assembly housing 31 is fixedly attached to the inner surface of the outer wheel 10.

Optionally, the clutch assembly housing 31 is fixedly attached to the inner surface of the outer wheel 10 by means of a compression fit therewith.

Also optionally, the clutch assembly housing 31 is fixedly attached to the inner surface of the outer wheel 10 by means of an adhesive applied therebetween.

Further optionally, the outer wheel 10 includes a stepped portion 111 forming a recess within the axial hole 11 for locating the spindle 20 therein.

Also optionally, the clutch assembly 31 includes a respective plurality of rolling channels 3121, each rolling channel 3121 operable for housing a rolling element therein, wherein each of the rolling channels has a slope angle which ranges from 5-15 degrees, and is 11.35 degrees in a particular embodiment. Further exemplary in this embodiment, each rolling element has an axis of movement along a respective rolling channel, and the separation between the rolling channel and the spindle is decreased to limit the movement of the rolling element along said axis of movement at a predefined distance, exemplary 1 mm, or alternatively 2 mm.

Further optionally, the one-way pulley includes two bearings 40a, 40b coaxially centered along the longitudinal axis of the outer wheel 12 and located on either side of the clutch assembly 30. Further exemplary in this embodiment, one of the two bearings 40b comprises a rear side bearing having an inner annular hole sized to form a compression fit with the outer surface of the spindle 20.

The one-way pulley may be included in an alternator assembly, whereby the coupling element 22 of the spindle 20 is used to connect to a rotor shaft of the alternator assembly. Further exemplary, said alternator assembly is employed within an automobile.

The foregoing embodiment is illustrative of the technical concepts and characteristics of the present invention so as to enable a person skilled in the art to gain insight into the contents disclosed herein and to implement the present invention accordingly. However, it is understood that the embodiment is not intended to restrict the scope of the present invention. Hence, all equivalent modifications and variations made to the disclosed embodiment without departing from the spirit and principle of the present invention should fall within the scope of the appended claims.

What is claimed is:

1. A one-way pulley system for an alternator assembly, comprising:

an outer wheel having an axial hole extending longitudinally therethrough, the axial hole forming an inner surface of the outer wheel, the outer wheel comprising a rotor side and an axially-opposed rear side;

a clutch assembly disposed within the axial hole of the outer wheel, the clutch assembly comprising a housing with an outer surface for contacting the inner surface of the outer wheel, and a plurality of rolling elements operable to extend into a pivot hole;

a spindle disposed within the pivot hole, the spindle having an outer surface for contacting the plurality of rolling elements and a coupling portion for connecting to a rotor shaft; and two bearings coaxially centered along the longitudinal axis of the outer wheel and located on either side of the clutch assembly, wherein the outer surface of the clutch assembly housing is fixedly attached to the inner surface of the outer wheel, wherein the axial hole is sized to receive a first of the two bearings from the rotor-side of the outer wheel and a second of the two bearings from the rear side of the outer wheel, and wherein the outer wheel includes a stepped portion forming a recess within the axial hole for locating the housing therein, whereby the stepped portion provides a barrier to the housing along the longitudinal axis of the axial hole.

2. The one-way pulley system of claim 1, wherein the clutch assembly housing is fixedly attached to the inner surface of the outer wheel by means of a compression fit therewith.

3. The one-way pulley system of claim 1, wherein the clutch assembly housing is fixedly attached to the inner surface of the outer wheel by means of an adhesive applied therebetween.

4. The one-way pulley system of claim 1, wherein the clutch assembly includes a respective plurality of rolling channels, each rolling channel operable for housing a rolling element therein.

5. The one-way pulley system of claim 4, wherein each rolling element has an axis of movement along a respective rolling channel, and wherein a separation between the rolling channel and the spindle is decreased to limit the movement of the rolling element along said axis of movement at a predefined distance.

6. The one-way pulley system of claim 1, wherein a second of the two bearings comprises an inner annular hole sized to form a compression fit with the outer surface of the spindle.

7. An automotive alternator having a one-way pulley system for coupling to a rotor shaft of the alternator assembly, the one way pulley system comprising:

an outer wheel having an axial hole extending longitudinally therethrough, the axial hole forming an inner surface of the outer wheel, the outer wheel comprising a rotor side and an axially-opposed rear side;

a clutch assembly disposed within the axial hole of the outer wheel, the clutch assembly comprising a housing with an outer surface for contacting the inner surface of the outer wheel, and a plurality of rolling elements operable to extend into a pivot hole;

a spindle disposed within the pivot hole, the spindle having an outer surface for contacting the plurality of rolling elements and a coupling portion for connecting to a rotor shaft; and two bearings coaxially centered along the longitudinal axis of the outer wheel and located on either side of the clutch assembly, wherein the outer surface of the clutch assembly housing is fixedly attached to the inner surface of the outer wheel, and wherein the axial hole is sized to receive a first of the two bearings from the rotor-side of the outer wheel and a second of the two bearings from the rear side of the outer wheel, and wherein the outer wheel includes a stepped portion forming a recess within the axial hole for locating the housing therein, whereby the stepped portion provides a barrier to the housing along the longitudinal axis of the axial hole.

8. The automotive alternator of claim 7, wherein the clutch assembly housing is fixedly attached to the inner surface of the outer wheel by means of a compression fit therewith.

9. The automotive alternator of claim 7, wherein the clutch assembly housing is fixedly attached to the inner surface of the outer wheel by means of an adhesive applied therebetween.

10. The automotive alternator of claim 7, wherein the clutch assembly includes a respective plurality of rolling channels, each rolling channel operable for housing a rolling element therein, wherein each of the rolling channels.

11. The automotive alternator of claim 10, wherein each rolling element has an axis of movement along a respective rolling channel, and wherein a separation between the rolling channel and the spindle is decreased to limit the movement of the rolling element along said axis of movement at a predefined distance.

12. The automotive alternator of claim 7, wherein one of the two bearings comprises a rear side bearing having an inner annular hole sized to form a compression fit with the outer surface of the spindle.

13. An automobile having an alternator assembly comprising a one-way pulley system for coupling to a rotor shaft of the alternator assembly, the one-way pulley system comprising:

an outer wheel having an axial hole extending longitudinally therethrough, the axial hole forming an inner surface of the outer wheel, the outer wheel comprising a rotor side and an axially-opposed rear side;

a clutch assembly disposed within the axial hole of the outer wheel, the clutch assembly comprising a housing with an outer surface for contacting the inner surface of the outer wheel, and a plurality of rolling elements operable to extend into a pivot hole;

a spindle disposed within the pivot hole, the spindle having an outer surface for contacting the plurality of rolling elements and a coupling portion for connecting to a rotor shaft; and two bearings coaxially centered along the longitudinal axis of the outer wheel and located on either side of the clutch assembly, wherein the outer surface of the clutch assembly housing is fixedly attached to the inner surface of the outer wheel, and wherein the axial hole is sized to receive a first of the two bearings from the rotor-side of the outer wheel and a second of the two bearings from the rear side of the outer wheel, and wherein the outer wheel includes a stepped portion forming a recess within the axial hole for locating the housing therein, whereby the stepped portion provides a barrier to the housing along the longitudinal axis of the axial hole.

14. The automobile of claim 13, wherein the clutch assembly housing is fixedly attached to the inner surface of the outer wheel by means of a compression fit therewith.

15. The automobile of claim 13, wherein the clutch assembly includes a respective plurality of rolling channels, each rolling channel operable for housing a rolling element therein.

16. The automobile of claim 13, wherein the one-way pulley assembly further comprises two bearings coaxially centered along the longitudinal axis of the outer wheel and located on either side of the clutch assembly, wherein one of the two bearings comprises a rear side bearing having an inner annular hole sized to form a compression fit with the outer surface of the spindle.

\* \* \* \* \*